United States Patent
Wesgh

[11] 3,874,972
[45] Apr. 1, 1975

[54] PROCESS FOR THE MANUFACTURE OF IMPROVED REINFORCED GLASS PIPES AND OTHER ARTICLES

[75] Inventor: Ludwig Wesgh, Heidelberg, Germany

[73] Assignee: Mancar-Trust, Vaduz, Liechtenstein

[22] Filed: Aug. 6, 1969

[21] Appl. No.: 848,060

Related U.S. Application Data

[63] Continuation-in-part of Ser. No. 651,126, July 5, 1967, Pat. No. 3,461,094.

[52] U.S. Cl.............. 156/169, 138/144, 156/171, 156/173, 161/60, 161/143, 161/162
[51] Int. Cl............................................. B31c 13/00
[58] Field of Search............ 161/143, 162, 168–170, 161/DIG. 4, 60, 185; 156/161, 162, 169, 156/170, 171, 173, 175, 176, 178, 179, 180, 156/184, 191, 195, 443, 446, 459; 138/144, 145, 153, 172, 174

[56] References Cited
UNITED STATES PATENTS

| | | | |
|---|---|---|---|
| 2,614,058 | 10/1952 | Francis | 156/171 |
| 2,748,830 | 6/1956 | Nash et al. | 156/171 |
| 2,803,576 | 8/1957 | Donaldson | 161/DIG. 4 |
| 2,857,932 | 10/1958 | Calderwood | 156/171 X |
| 3,177,902 | 4/1965 | Rubenstein | 138/176 |
| 3,338,271 | 8/1967 | Plummer et al. | 161/60 X |
| 3,373,075 | 3/1968 | Fekete et al. | 161/185 |
| 3,414,460 | 12/1968 | Hassert et al. | 161/185 X |
| 3,470,917 | 10/1969 | Grosh | 156/173 X |
| 3,483,896 | 12/1969 | Grosh | 138/144 X |

*Primary Examiner*—William A. Powell

[57] ABSTRACT

A process and the products obtained thereby which comprises preparing high tensile strength non-homogeneous fiberglass reinforced plastics and resins by incorporating also specially treated fillers therein; the manufacture of pipes, plates, and the like is especially contemplated.

2 Claims, 10 Drawing Figures

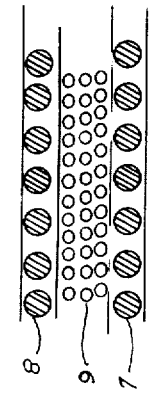
Fig.5b
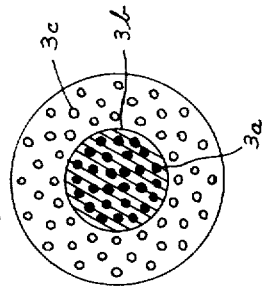
Fig.4
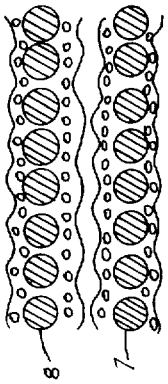
Fig.5a
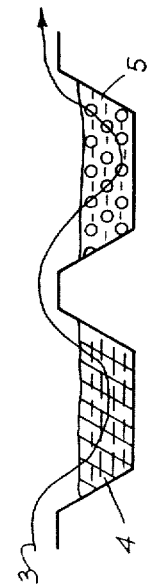
Fig.1
Fig.2
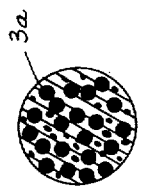
Fig.3

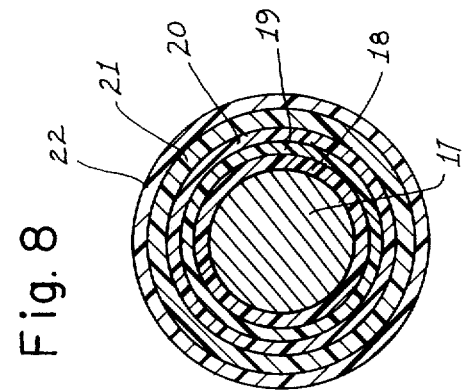
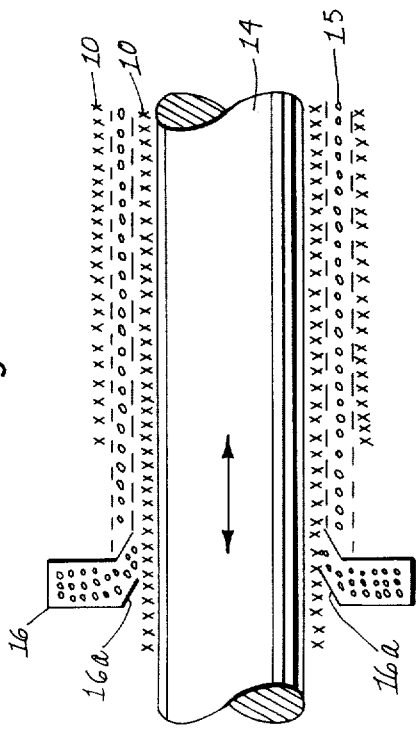

PROCESS FOR THE MANUFACTURE OF IMPROVED REINFORCED GLASS PIPES AND OTHER ARTICLES

CROSS REFERENCE TO RELATED APPLICATION

This application is a continuation-in-part of my copending application, Serial No. 651,126, filed on July 5, 1967 and entitled "Process For the Manufacture of Reinforced Pipes and Other Articles", now U.S. Pat. No. 3,461,094.

BACKGROUND OF THE INVENTION

The known processes to produce glass-reinforced pipes, plates and other shaped articles by using Rovings, mats, or fabrics, employing either a continuous, or a non-continuous process, are able to yield high mechanical values only when the glass content for reinforcement is, at least, 70 percent.

However, for the large-scale use of all fiberglass-reinforced artificial fabrics it is of utmost importance that the cost be as low as possible as well as that the products be of high quality.

Fundamentally, the determinating cost factor for the manufacture of fiberglass synthetic fabrics is the price for the Rovings, and only thereafter is the price for the resins necessary for consideration.

It has now been found that it is possible to obtain high-tensile strength in fiberglass-reinforced synthetic products using a much lower content of fiberglass if other fillers previously subjected to a special treatment are used and if, in addition, a special process is employed for the manufacture of the pipes, plates, and other articles. It is of special significance that the special treatment required is much cheaper than using the large amount of reinforcement to obtain the same result.

The resin types which can be used to make these reinforced products include polyester resins, epoxide resins, hydrocarbon resins and polymethacryl resins.

In my earlier filed application it was set forth that the preferred balance between quality of product and cost has been found to be a combination of:

⅓ parts resin
⅓ parts fiberglass
⅓ parts filler.

It was also stated in my earlier filed application, of which the instant application forms a continuation-in-part, that it is possible to spread the filler mixture between adjacent layers composed of resin soaked Roving strands. The use of such a process will result in a non-homogeneous end product and it is this process which forms the subject matter of the instant continuation-in-part application. The overall filler content of the composition prepared in accordance with this process can be significantly increased without substantially reducing the overall full strength of the composition. Thus, for example, the layer which is formed between adjacent layers of resin soaked Roving strands can contain up to 90 percent by weight of filler material and only 10 percent by weight of resin.

For high-tensile strengths, it is necessary to apply to the filler, before mixing it with the resin, a vinyl silane coating, which will insure a good combination between the filler and the resin as well as other advantages.

Further, it has been found that not all fillers have the same consistency when combined with silanes. For this reason, fillers are employed in the new process, which are obtained either from natural sources, or synthetically.

The most important raw material for fillers is pulverized quartz. However, other minerals with a high $SO_2$ content may be also employed. It is, of course, possible to combine the filler directly with resin by employing vinyl silane esters.

Of most importance are the inorganic fillers. These may consist of such materials as pulverized quartz, minerals with a high $SiO_2$ content, such as precipitated silicious acid, pure, or precipitated silicious acid with a low percentage of calcium silicates, aluminum oxide, aluminum minerals with a silicon content, titanium dioxide, zinc oxide, zirconium dioxide, or substances containing these materials and combinations thereof.

Besides silicious substances, substances with an aluminum basis may be also employed, as well as aluminum oxide or aluminum minerals with a silicon content. Also included are substances, such as titanium dioxide or zirconium dioxide, or substances in combination with the same. All fillers are soaked in a solution of a rapidly evaporating solvent, such as water, or water mixtures, preferably with acetone, toluene, ethyl acetate, ethanol, or other volatile alcohol to which 0.1 to 10 parts of the selected vinyl silanester have been added.

For use with polyester resins, product A 172 of Union Carbide from the United States has proved to be of good service and, for the epoxy resins, A 1100 from the same company. However, other silane products may also be used, as well as similar products from Wacker Chemie in Munich, Germany. A more complete list of the silanes employed is shown in Table 1.

For every 100 grams of filler, 50 grams of solution are normally used. The filler is preferably mixed with the solvent in an agitator, the solvent being thereafter evaporated.

In some cases it has been found advisable, when an especially good bond is required — particularly in those cases where the particle size of the fillers is lower than 10 microns, to add up to 10 percent vinyl silanester to the solvent. In addition, it is recommended to add to the solvent also up to 30 percent of the resin to be employed. The solvent should be selected in accord with the type of resin involved.

A particularly good effect may be obtained from substances containing hydroxyl groups if, additionally, isocyanates are added to the solvent or resins. It has been ascertained that the preparation Desmodur TT (dimerized 2.4 — toluylendiisocyanate) or Desmodur R (20 percent solution of triphenylmethanetriisocyanate), or similar isocyanate preparations from Bayer-Werke, Leverkusen, Germany, are adequate for the above purpose. The pre-prepared fillers, in the manner mentioned above, are mixed with the resin and then processed by the usual methods.

For the required tensile strength and proper consistency of the working material to be obtained, the exact matting of the fiberglass with the resin is of utmost importance.

SUMMARY OF THE INVENTION

The most expensive ingredient of the fiberglass reinforced articles is the fiberglass. The second most expensive ingredient is the resin, whereas the third and least expensive ingredient is the filler material. It is, therefore, a general object of this invention to provide a method for manufacturing fiberglass reinforced pipes and other articles using a minimum amount of fiberglass, a maximum amount of filler material and an optimum amount of resin without substantially detracting from the mechanical properties of the end product.

BRIEF DESCRIPTION OF THE DRAWING

The invention will be better understood by referring now to the exemplary embodiments as illustrated in the accompanying drawing, in which:

TABLE 1

Chemical Compositions of the Monomers of Silane

| Product Name | Nomenclature | Formula |
|---|---|---|
| A-151 | Vinyl-triethoxy-silane | $CH_2=CHSi(OC_2H_5)_3$ |
| A-153 | Phenyl-triethoxy-silane | $C_6H_5Si(OC_2H_5)_3$ |
| A-172 | Vinyl-tris-(beta-methoxy-ethoxy)silane | $CH_2=CHSi(OCH_2CH_2OCH_3)_3$ |
| A-174 | gamma-Methacryl-oxypropyl-trimethoxy-silane | $CH_2=C\overset{CH_3O}{-}C-O(CH_2)_3Si(OCH_3)_3$ <br> C-C |
| A-186 | beta-(3,4-epoxy-cyclo-hexyl-ethyl-trimethoxy-silane | (epoxy-cyclohexyl)$-CH_2CH_2Si(OCH_3)_3$ |
| A-187 | gamma-Glycide-oxypropyl-trimethoxy-silane | $CH_2\overset{\diagdown}{-}\underset{O}{CH}-CH_2-O(CH_2)_3Si-(OCH_3)_3$ |
| A-1100 | Gamma-Amino-Propyl-triethoxy-silane | $NH_2CH_2CH_2CH_2Si(OC_2H_5)_3$ |
| A-1120 | N-beta-(amino-ethyl)-gamma-amino-propyl-trimethoxy-silane | $NH_2CH_2CH_2\overset{H}{N}(CH_2)_3Si(OMe)_3$ |
| A-1911 | beta-Carbethoxy-ethyl-triethoxy-silane | $C_2H_5O\overset{O}{\overset{\|}{C}}CH_2CH_2Si(OC_2H_5)_3$ |
| Y-1575 | beta-Cyano-ethyl-triethoxy-silane | $NCCH_2CH_2Si(OC_2H_5)_3$ |
| Y-2525 | Vinyl-trimethoxy-silane | $CH_2=CHSi(OCH_3)_3$ |
| Y-2815 | Amyl-trimethoxy-silane | $C_5H_{11}Si(OCH_3)_3$ |
| Y-2967(a) | bis(beta-Hydroxy-ethyl)-gamma-amino-propyl-triethoxy-silane | $(HOCH_2CH_2)_2N(CH_2)_3Si(OC_2H_5)_3$ |
| Y-4351 | gamma-Chloropropyl-trimethoxy-silane | $ClCH_2CH_2CH_2Si(OCH_3)_3$ |
| Y-4522 | beta-Mercapto-ethyl-trimethoxy-silane | $HSCH_2CH_2Si(OCH_3)_3$ |
| Y-5065 | Bi-cycloheptenyl-triethoxy-silane | (cycloheptenyl)$-Si(OC_2H_5)_3$ |
| Y-5107(b) | beta-(Chloro-methyl-phenyle)propyl-triethoxy-silane | $ClCH_2C_6H_4-\overset{CH_3}{\underset{CH_3}{\overset{\|}{C}H}}-CH_2Si(OC_2H_5)_3$ |
| Y-5271 | gamma-Chloro-iso-butyl-triethoxy-silane | $ClCH_2\overset{\diagup}{C}H-CH_2Si(OC_2H_5)_3$ |
| Y-5272 | beta-Cyclo-hexyl-ethyl-trimethoxy-silane | (S-cyclohexyl)$-CH_2CH_2Si(OCH_3)_3$ | a) These materials represent 62% weight in ethanol.

b) These materials are a combination of ortho & para-isomers.

Figure 6B:
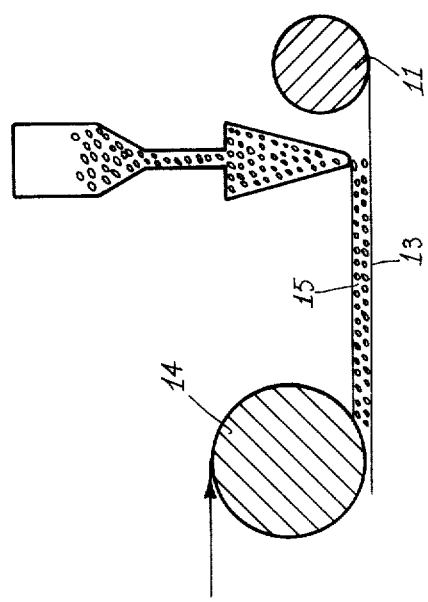
Figure 6A:
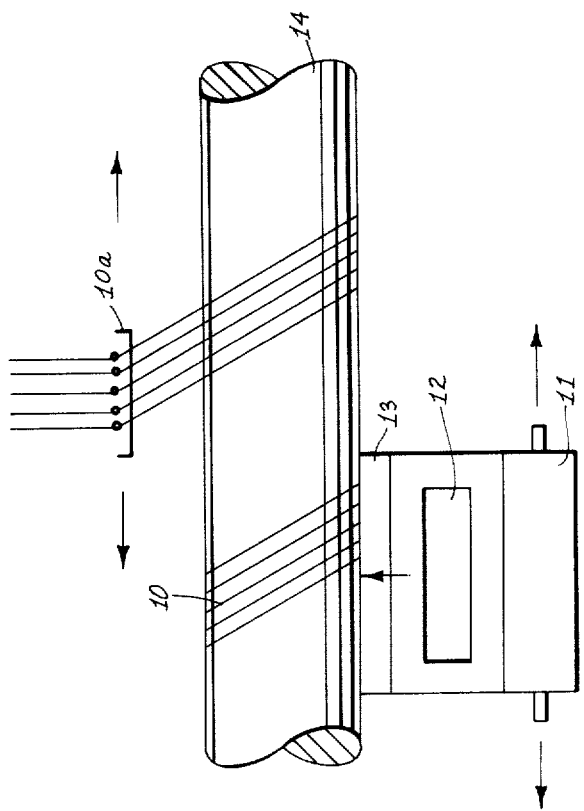

FIG. 1 illustrates diagrammatically in cross section a portion of an article which is composed of a quasi homogeneous mixture of fiberglass, filler material, and resin;

FIG. 2 illustrates diagrammatically the two soaking baths which are being used in the process of this invention which produce a Roving strand having a non-homogeneous composition;

FIG. 3 illustrates diagrammatically a cross sectional view of a Roving strand after having passed through the first soaking bath;

FIG. 4 is a diagrammatic cross sectional view of a Roving strand having passed through the first and second soaking baths;

FIGS. 5a and 5b are diagrammatic cross sectional views of sections of an article having been manufactured according to the process of this invention;

FIG. 6a is a plan schematic view of a portion of the apparatus used in the process of this invention;

FIG. 6b is an elevational view of the portion of the apparatus illustrated in FIG. 6a;

FIG. 7 is a schematic plan view of another embodiment of an apparatus for carrying out the process of this invention; and FIG. 8 is an end elevation of a pipe made in accordance with the apparatus illustrated in FIG. 7.

A DETAILED DESCRIPTION OF THE INVENTION

Referring now in detail to the drawing there is illustrated in FIG. 1, a cross sectional view of a wall portion of an article composed of resin soaked filler material 1 and fiberglass Roving-strands 2. It can be noted that the filler material, resin, and Roving-strands are uniformly distributed throughout the article thereby forming a quasi-homogeneous mass. Such an article can be produced by passing the fiberglass Roving-strands through a soaking bath containing a mixture of resin and filler material and thereafter winding the soaked strands around a winding drum. The Roving-strand, as it passes through the soaking bath, is simultaneously soaked with filler material and resin.

FIG. 2 illustrates diagrammatically the double soaking baths of the process of this invention which results in a non-homogeneous distribution of the fiberglass-filler material-resin-mixture. In this process the Roving-strand or band or fiberglass mat 3 is passed through a first soaking bath 4. This first soaking bath 4 contains only a suitable liquid resin and not any filler material. After the Roving-strand has passed through the first soaking bath 4 it has a composition such as illustrated in the cross sectional view of FIG. 3, wherein 3a represents the Roving-strand, and 3b the resin. The Roving-strand is then passed through the soaking bath 5 which contains a suitable liquid resin as well as an optimum quantity of suitable filler material. For example, the bath 5 may contain 90 percent by weight of filler material and 10 percent by weight of liquid resin. After the Roving-strand has been passed through the bath 5, it looks in cross section as is diagrammatically illustrated in FIG. 4. Thus, it can be noted in FIG. 4 that the core of the strand is composed entirely of fiberglass strands and resin material, whereas the exterior layer 3c is composed of resin and filler material. The strand as illustrated in FIG. 4 forms the basic building block of a fiberglass reinforced non-homogeneous article. Such a non-homogeneous article is further illustrated in FIGS. 5a and 5b, wherein there are illustrated three layers of such an article. As can be noted the layers 7 and 8 are very rich in glass fibers and relatively poor in filler material because in the soaking bath 4 there is preferably present a liquid resin material having a low viscosity which results in a better soaking without filler material. This article further comprises a second layer 9 which is substantially composed of filler material and resin. It is also contemplated by the process of this invention to include some filler material in the first soaking bath 4 in order to give additional strength to the end product. The maximum filler material content in the soaking bath 4 should, however, not exceed 20 percent by weight, so that the total resin content of the end product is not too low.

It was stated in my parent application that the filler material may be spread between every two layers of fabric or mat after the soaking in the first tank or bath has been effected. The spreading of such a resin-poor but filler material-rich mass between adjacent layers of fiberglass reinforced mats, or web material, or plates, or other similar articles can be effected in many different ways. Thus, for example, the material can be spread manually or sprayed onto a layer or pressed onto a layer via a nozzle. Fiberglass reinforced pipes can be manufactured in a similar manner.

FIGS. 6a and 6b illustrate diagrammatically how such a fiberglass reinforced pipe may be manufactured in a discontinuous process. Fiberglass Roving-strands or bands 10 are wound around a winding cylinder 14 by means of the filament winding process. The Roving-strands or bands 10 have been soaked, prior to being wound around cylinder 14 in a liquid resin bath which may contain a small amount of filler material such as, for example, 10 percent by weight. Such a small amount of filler material will not substantially detract from the overall strength of the end product. The Roving-strands or bands are wound around the cylinder 14 after having been passed through a thread-guide member 10a, which moves along the rotating cylinder 14 in an axial direction. A filler material-rich layer is applied to the Roving-strands prior to a complete revolution. This application of the filler material-rich layer can be effected by means of an arrangement which also moves longitudinally along the cylinder 14 in an axial direction. This arrangement comprises a roller 11 on which there is wound a sheet which may consist of absorbent pulp material, or polyester material, or PVC, or polyethylene, or artifical rubber, or other suitable organic material, or raw linen, or preferably fiberglass web material, or a fiberglass mat. This sheet material 13 is wound around the cylinder 14 jointly with the Roving-strands or bands 10. A resin-filler material mixture 15 is stored in a container and is applied via a nozzle 12 onto the sheet material 13. The container and nozzle 12 can, of course, be substituted by any other suitable means. The resin-filler material mixture 15 can, of course, be applied to the sheet material 13 by any other suitable means. FIG. 6b illustrates the apparatus of the invention of FIG. 6a in cross section. Whereas the apparatus illustrated in FIGS. 6a and 6b produces reinforced fiberglass pipes having a non-homogeneous mass in a discontinuous manner, it is also possible to produce such pipes in a continuous manner. FIGS. 7 and 8 illustrate diagrammatically and schematically an apparatus for producing such fiberglass reinforced pipes in a continuous manner. In such a process the glass fiber-rich thin layer comprising the Roving-strands 10, it is applied in a known manner onto a non-rotating or rotating cylinder 14. The Roving-strands may be wound onto a cylinder 14, for example, as illustrated in FIGS. 6a and 6b. The apparatus illustrated in FIG. 7 is provided with a circular nozzle 16a which is connected to a suitable container 16 in which a mixture of filler material and resin is stored. The cylinder 14 is automatically moved in an axial direction as indicated by the arrow in FIG. 7, while the filler material-rich layer 15 is applied by means of the circular nozzle 16a onto the thin layer comprising the Roving-strands 10. Thereafter, there can be wound onto the filler material-rich layer 15 a further thin layer of resin-soaked Roving-strands 10. If the resulting pipe is not sufficiently thick, a second filler material-rich layer may be applied by means of a second circular nozzle arrangement and so on.

FIG. 8 illustrates in cross section one embodiment of a fiberglass reinforced pipe which has been manufactured in accordance with the process and apparatus of this invention. There is illustrated a winding cylinder 17 onto which there has been wound a first layer 18 consisting of a sheet of Cellophane material. A second layer 19 consisting of a liner made of acrylnitrilbutadine PVC — rubber with a binder of epoxy resin. A basic third layer 20 consisting of fiberglass soaked with polyester resin and having an elastic limit of 2 – 5 percent, and preferably of 3 percent. Thereafter, there is shown a fourth layer 21 which is rich in filler material and contains 80 percent by weight of an oven dried sand having an average particle size of 0.8 mm and contains 20 percent by weight of a known polyester resin to which 2 percent vinylsilane has been added. Thereafter, the pipe includes an exterior fifth layer 22, the composition of which corresponds to the layer 20.

The thicknesses of the various layers of the non-homogeneous fiberglass reinforced pipe depend on the ultimate use of such pipes. Thus, for example, in the pipe illustrated in FIG. 8 the layers 20 and 22 will have thicknesses of one 1 to 5 mm, preferably 2½ mm and the layer 21 will have a thickness of 3 – 15 mm, preferably 7 mm, if the pipe illustrated in FIG. 8 is to be used underground and will by subjected to large soil pressures. When the pipe is used for conducting water, it may be constructed to have diameters up to 3,000 mm. Water-conducting pipes can have a thickness double that illustrated in FIG. 8. In such an arrangement the additional layer 23 (which is not illustrated) would have a composition corresponding to the layer 21 and no further exterior layer would be applied. Alternately, an additional exterior layer 23 can be applied which has the composition corresponding to the layer 22.

It will be evident to those skilled in the art that the arrangements illustrated respectively in FIGS. 6a, 6b, and 7 can be alternately used for producing pipes, such as for example, illustrated and described in FIG. 8. It will, furthermore, be evident to those skilled in the art that the process described herein for manufacturing pipes can also be applied to other shapes and forms such as, for example, plates and blocks. Fiberglass reinforced plates have been found to be very useful in the construction industry.

All types of reacting resins, which are generally used in conjunction with fiberglass materials, have been found to be suitable in the process of this invention. Furthermore, the process of this invention can also be used in conjunction with fiberglass reinforced thermoplastic materials, or in combination of thermo-plastic and duro-plastic materials. It has been found to be particularly advantageous to combine polyester in epoxy resins in a single layer. It is known that epoxy resins are good binding agents and therefore are particularly adaptable to be used in conjunction with a high filler material content. Epoxy resins will give a high strength to the end product when used in conjunction with such a high filler material content. For this reason it is, for example, advantageous to use in the layers 20 and 22 of the pipe illustrated in FIG. 8 epoxy resins because they will produce a better binding between the individual layers and thereby increase the overall tensile and shearing strength of the pipe. There are set forth hereinbelow various examples of compositions which are suitable for the layers 20, 22, as well as 21 of the pipe illustrated in FIG. 8. These compositions are meant to supplement the compositions set forth in the various examples of my copending parent application, Ser. No. 651,126, now U.S. Pat. No. 3,461,094.

EXAMPLE 1

Layer 20/22

Polyester resin 100 parts by weight, viscosity 200 – 500 cP; hardening agent 2 percent, for example, Butanox (Fa. Oxydo of Emmerich, Germany) Accelerator 49 : 0.2 percent (Fa. Oxydo of Emmerich, Germany);

The resin content in this layer can vary between 20 and 80 percent, the remainder being composed of glass fiber material. It is also possible to substitute a portion of the glass fiber material by means of a filler material, for example, magnesium aluminum silicate having an average grain size of 20 microns. The average content of filler material should be about 20 percent.

Layer 21

Polyester resin having a viscosity of 200 – 500 cP, 80 parts by weight;

Polyester soft resin having a viscosity of 200 – 800 cP, 20 parts per weight;

hardening agent 2 percent Butanox;

accelerator 49: 0.2 percent;

vinyl-tris-(beta- methoxy-ethoxy) silane 1 percent;

dried quartz sand having a grain size of 0 – 1 mm diameter, 95 parts by weight;

magnesium aluminum silicate or biotit 3 – 4 parts by weight having an average grain size of 20 microns;

talcum 1 – 2 parts by weight.

The aforedescribed composition of layer 21 can, in accordance with this invention, be varied so that the layer will contain approximately 20 percent resin and 80 percent filler material. The guiding factor in selecting the exact composition will depend on the type and size of the grains forming the filler material. What should be accomplished is that a very dense and packed composition will result.

The following grain sizes have been found to be suitable as filler materials:

| Diameter of the grains mm | | Percentage by weight of grain sizes |
|---|---|---|
| 0 | to 0.09 | 3 to 18 |
| 0.09 | to 0.2 | 4 to 32 |
| 0.2 | to 0.5 | 16 to 32 |
| 0.5 | to 1.0 | 18 to 77 |

If a particularly strong pipe is to be manufactured, that is, a pipe which has strength both in the axial and radial directions, then the grain size mixture as set forth in the example above can be substituted by a fiber mixture, so that the total filler material and fiber content will amount to 80 percent.

What is claimed is:

1. A process for the manufacture of high-tensile strength, fiberglass-reinforced artificial fiber resin products with reduced glass content which comprises alternately combining at least one first layer comprising fiberglass roving strands soaked with resins with at least one second layer comprising a mixture of filler material and lqiuid resin;

passing said strands through a first bath containing a liquid resin and up to 20 percent by weight of filler material;

and then through a second bath containing a mixture of liquid resin and up to 90 percent by weight of filler material;

thereby producing a non-homogeneous product in which said first and second layers alternate.

2. The process as set forth in claim 1, wherein said strands are wound around a cylinder after leaving said bath so as to form, when solidified, a pipe wherein said first and second layers alternate.

* * * * *